(12) United States Patent
Ramesh et al.

(10) Patent No.: US 6,654,872 B1
(45) Date of Patent: Nov. 25, 2003

(54) VARIABLE LENGTH INSTRUCTION ALIGNMENT DEVICE AND METHOD

(75) Inventors: T. R. Ramesh, Union City, CA (US); Korbin S. Van Dyke, Sunol, CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/490,888

(22) Filed: Jan. 27, 2000

(51) Int. Cl.[7] .............................................. G06F 9/315
(52) U.S. Cl. ....................................... 712/204; 712/210
(58) Field of Search ................................. 712/204, 210

(56) References Cited

U.S. PATENT DOCUMENTS

| | | | | |
|---|---|---|---|---|
| 5,581,718 A | * | 12/1996 | Grochoski | 395/382 |
| 5,619,666 A | * | 4/1997 | Coon et al. | 712/204 |
| 5,845,100 A | * | 12/1998 | Gupta et al. | 712/204 |
| 6,321,325 B1 | * | 11/2001 | Tremblay et al. | 712/204 |

* cited by examiner

*Primary Examiner*—William M. Treat
*Assistant Examiner*—Liang-che Alex Wang
(74) *Attorney, Agent, or Firm*—Vedder, Price, Kaufman & Kammholz

(57) ABSTRACT

An instruction aligner and method evaluates a fixed length instruction cache line by breaking it into at least two components. These two components, in one embodiment, include half of the instruction cache line being designated as most significant bytes and the second half of the instruction cache line being designated as least significant bytes. A byte right rotator is responsible for feeding the next sixteen bytes of the instruction stream, while a byte right shifter shifts the unused bytes of the current sixteen bytes the aligner is working on. The byte rotator and byte shifter combine to provide aligned variable length instructions for decoding based on either a fetch PC value or current instruction length.

13 Claims, 6 Drawing Sheets

VARIABLE LENGTH INSTRUCTION ALIGNMENT DEVICE AND METHOD

FIELD OF THE INVENTION

The invention relates generally to processor instruction alignment methods and devices, and more particularly to instruction alignment methods and devices for aligning variable length instructions prior to instruction decoding and execution.

BACKGROUND OF THE INVENTION

Many microprocessors and other instruction execution devices employ pipeline structures used to fetch, decode, execute and commit each instruction. In addition, processors are known to employ variable length instruction sets, such as Intel® X.86 family of microprocessors. Such microprocessors may also employ native instructions such as fixed length RISC instructions to which variable length instructions are converted to accomplish the work of the complex instructions. For example, X.86 instruction lengths are in the range of one to fifteen bytes depending upon the type of instruction. In contrast, the native instruction set may include fixed length instructions, such as instructions being four bytes in length.

In addition, such systems may fetch a fixed number of bytes during a fetch, such as 32 bytes each time a fetch occurs. Accordingly, each cache line may contain 32 bytes, which may include a number of different instructions. Accordingly, with a fixed length fetch group, where the fetch addresses are cache aligned, fetches occur on cache aligned fetch program count values. For example, although a target fetch address may be address 0x8004, the fetched addresses for a fixed fetch group may start, for example, on a cache aligned fetch PC 0x8000 resulting in 32 bytes ending at fetch PC 0x801 f. As a result, instruction bytes corresponding to fetch PC 0x8000–0x8003 have to be discarded. With variable length instructions, an instruction can wrap to another cache line. All that is typically known at the time of instruction fetch, is the starting address of the first instruction. To decode one instruction per cycle, for example, the system needs to compute the length of the first instruction and provide instruction bytes for the decoder.

One solution may be to employ a single shifter that is fed with 32 contiguous bytes of instruction stream and shifting based on the instruction length. This requires control logic to know when and how many bytes of the next fetch quanta to be applied to the shifter which is a function of the current instruction length. Also, this requires additional storage for the fetched instruction bytes to provide a continuous stream of bytes to the shifter.

Consequently, there exists a need for an instruction aligner and method for a variable length instruction set providing a reduction in memory requirements to accommodate suitable instruction alignment for decoding.

BRIEF DESCRIPTION OF THE DRAWINGS

The invention will be more readily understood in view of the following drawings wherein:

FIG. 1b is a state diagram graphically representing one example of the operation of the instruction aligner of FIG. 1a.

DETAILED DESCRIPTION OF A PREFERRED EMBODIMENT OF THE INVENTION

Briefly, an instruction aligner and method evaluates a fixed length instruction cache line by breaking it into at least two components. These two components, in one embodiment, include half of the instruction cache line being designated as most significant bytes and the second half of the instruction cache line being designated as least significant bytes. A byte right rotator is responsible for feeding the next sixteen bytes of the instruction stream, while a byte right shifter moves unused bytes from left to right, discarding the used bytes of the current sixteen bytes the aligner is working on. The byte rotator and byte shifter combine to provide aligned variable length instructions for decoding based on either a fetch PC value or current instruction length.

In one embodiment, a byte right rotator rotates bytes from either of the more significant bytes or less significant bytes and a byte right shifter shifts bytes from either of the more significant bytes or the less significant bytes based on a program count value of the target fetch instruction or the length of the current instruction.

Figure 1A:
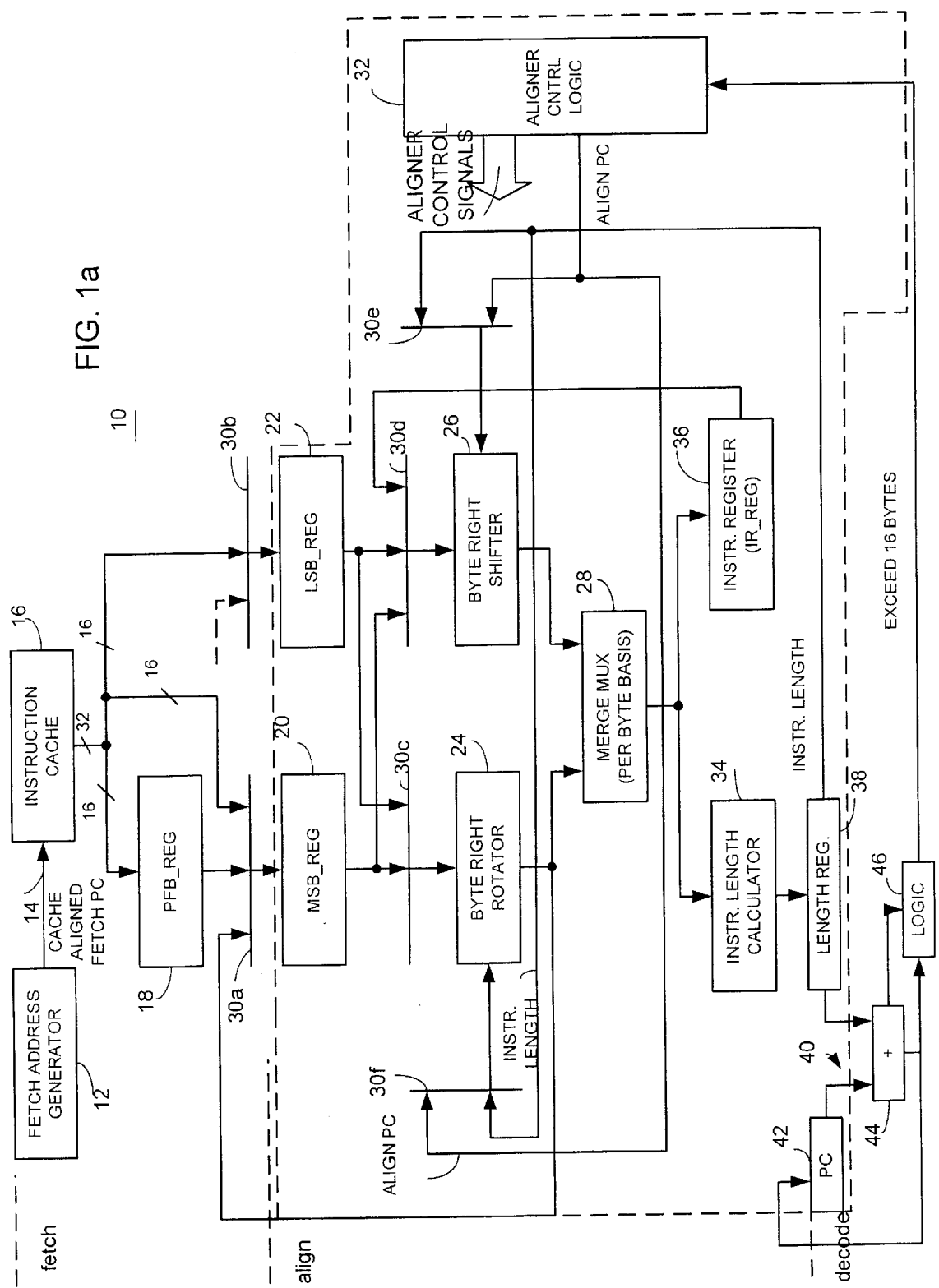
FIG. 1a is a block diagram illustrating one example of an instruction aligner for a variable length instruction set in accordance with one embodiment of the invention.

FIG. 1a illustrates one example of an instruction aligner 10 utilized, for example, during an align stage in an instruction pipeline. As part of an instruction fetch operation, a fetch address generator 12 generates a cache aligned fetch address 14 to fetch a group of instructions such as a fixed number of instructions (e.g., 32 bytes) that serve as a cache line of fetched instructions. The fetch address generator 12, as known in the art, generates a cache aligned fetch PC and this is used to fetch a group of thirty-two bytes as an instruction cache line from an instruction cache 16. The fetch group may be, for example, a fixed length fetch group having a multiple of eight bytes, such as thirty-two bytes.

The instruction aligner 10 includes a prefetch buffer (PFB) register 18, a current more significant bytes buffer (MSB) register 20, a less significant bytes buffer (LSB) register 22, a byte right rotator 24, a byte right shifter 26, a merge multiplexer 28 and a plurality of multiplexers 30a–30f. Aligner control logic 32 provides suitable control signals to control the components 18–30. In this embodiment, the instruction aligner 10 also includes an instruction length calculator 34, an instruction register 36 and an instruction length register 38 as part of an instruction decode stage of the pipeline.

The MSB register 20 is operatively controlled by the aligner control logic 32 to store an upper number of bytes, such as the upper sixteen bytes of the current thirty-two byte fetch group. The LSB register 22 is operatively controlled by the aligner control logic 32 to store a lower number of bytes, such as the lower sixteen bytes of the current 32 byte fetch group until a first least significant byte has been aligned. At later points in time, the LSB register 22 is also controlled to serve as a prefetch LSB buffer to store a lower number of bytes, such as the lower half of the thirty-two byte cache line of a next fetch group. In this embodiment, the MSB register and the LSB register are each one half of the size of the fixed length fetch quanta.

A shift amount provided to the rotator 24 and shifter 26 through multiplexers 30f and 30e respectively are derived as follows: when instruction bytes corresponding to a target fetch address are fetched, then a program counter value (align_PC) which is derived from the target fetch address is used to control the rotator and shifter. The instruction length calculator is then used to compute the length of the instruction and this length is stored in the instruction length register 38. Then in the next cycle, the rotator 24 and shifter 26 are fed with shift amounts which are based on the instruction length register. A new instruction length is computed and saved in the instruction length register.

The byte rotator 24 rotates a portion of cache aligned fetch bytes from a cache line of a fetch group under control of the aligner control 32. The byte shifter 26 shifts a portion of the cache aligned fetched bytes from the previous fetch group. The byte merger 28 is operatively coupled to receive output from the byte rotator 24 and from the byte shifter 26 to selectively output aligned variable length instructions for decoding. The byte merger 28 merges, on a byte by byte basis, rotated and shifted bytes. The selection of which bytes are multiplexed at any given time from the byte rotator and the byte shifter is controlled by the aligner control logic 32.

The PFB register 18 is operatively coupled to the instruction cache 16 and provides bytes to the MSB register 20. The PFB register 18 stores the most significant bytes of the next fetch group, in this example the most significant sixteen bytes of a fetched instruction cache line. In this example, the upper number of bytes for the most significant bytes, are the upper half bytes from a fetched cache line. A lower number of bytes, such as the least significant sixteen bytes, are the lower half of bytes from the fetched cache line. However, it will be recognized that although the preferred implementation operates on one half of the instruction cache line, any suitable portion may be utilized.

Figure 1B:
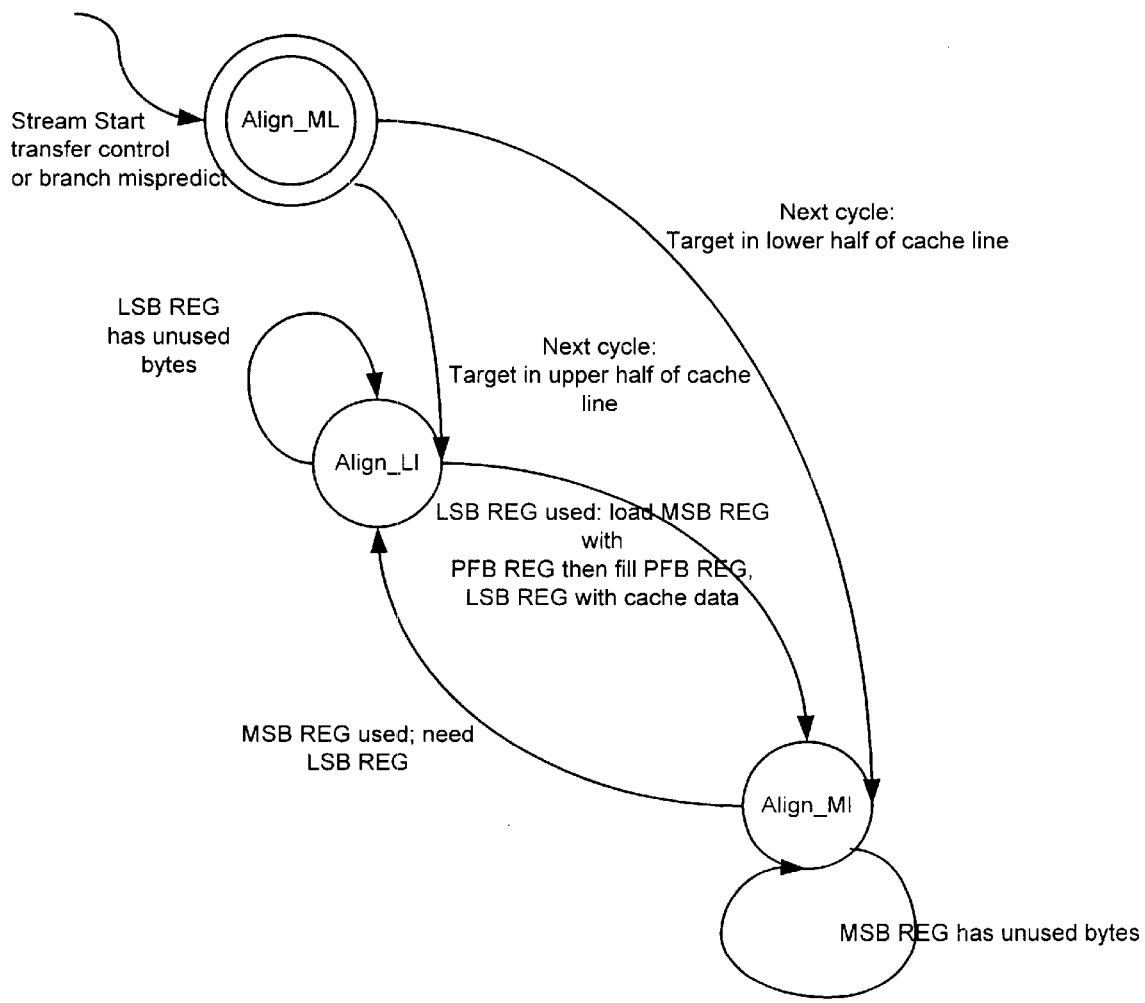

Referring to FIG. 1b, instruction fetching for a stream begins with the execution of a transfer control, defining a new fetch address as the target of the transfer, as shown in the Align_ML state (where M refers to the MSB register and L refers to the LSB register). The instruction stream ends when a taken transfer control exits the current stream to begin the instruction fetch process anew at the newly created target stream. Until the transfer creates the new stream, fetching continues sequentially in the current stream.

The first fetch quanta (e.g., 32 bytes) at the target is stored in the MSB and LSB registers. If the target is in the upper half of the fetch quanta, only the data in MSB is useful (LSB is ignored). Otherwise, both the MSB and LSB registers are useful. Both situations are described below.

If the target is in the lower half of the fetch quanta, a full fetch quanta of valid target information is available in the MSB and LSB registers. These bytes are aligned into the MSB register and the IR register, and an asynchronous sequential instruction fetch is initiated, as shown by the Align_MI state. These instruction bytes will be stored in the prefetch buffer (PFB) and the LSB register, which are currently free. Alignment of the MSB register and the IR register continues until the bytes in MSB register are consumed by the alignment process. Then processing stalls until the previously initiated sequential instruction fetch completes. Subsequently alignment continues with the new fetch data in the LSB register, treating the LSB register and IR register as the alignment argument (this is the Align_LI state and this is where the target in the upper half mechanism, described below, joins the processing.) When the LSB register is consumed, the contents of the PFB are moved into the MSB register, and another asynchronous sequential fetch is started. The fetching and alignment process continues with the MSB register and the IR register, just as in the beginning of the stream processing as shown in the transition from state Align_LI to Align_MI. Alignment continues transitioning between the Align_LI state and the Align_MI state until a predicted taken transfer control is encountered.

If the target is in the upper half of the fetch quanta, the instruction bytes in the MSB register are aligned (in the next clock) into the IR register, immediately freeing the MSB (LSB was already free since no meaningful data was stored there), and an asynchronous access for the next sequential fetch quanta is begun. The instruction bytes from this access will be stored in PFB and the LSB registers, which are currently free. As soon as this fetch completes, the LSB register is marked as valid, and alignment of the LSB register and the IR register continues as indicated by the Align_LI state.

Figure 2A:
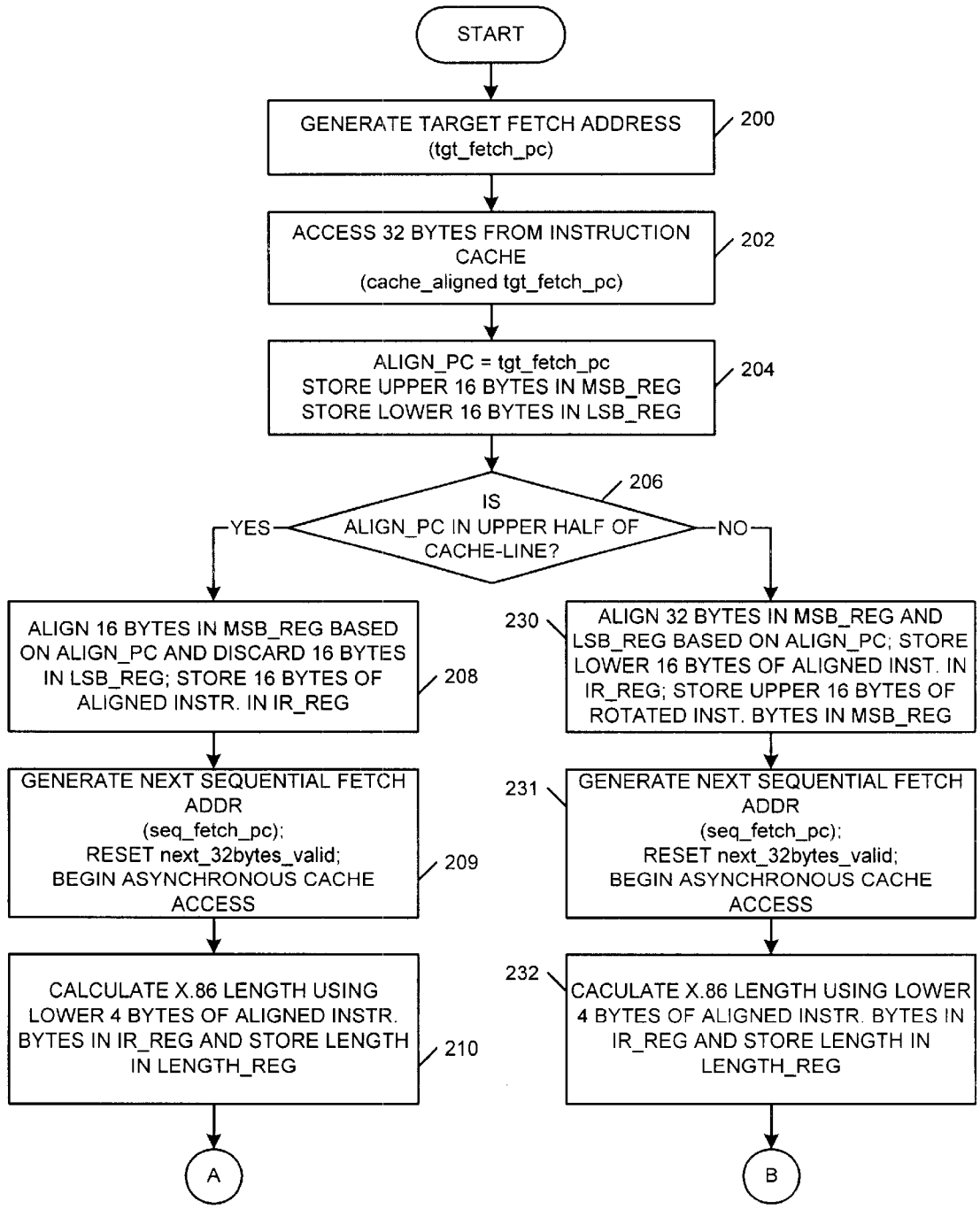
FIGS. 2a–2c illustrate a flow chart showing one example of the operation of the instruction aligner shown in FIG. 1 for cacheable instruction fetches.
Figure 2B:
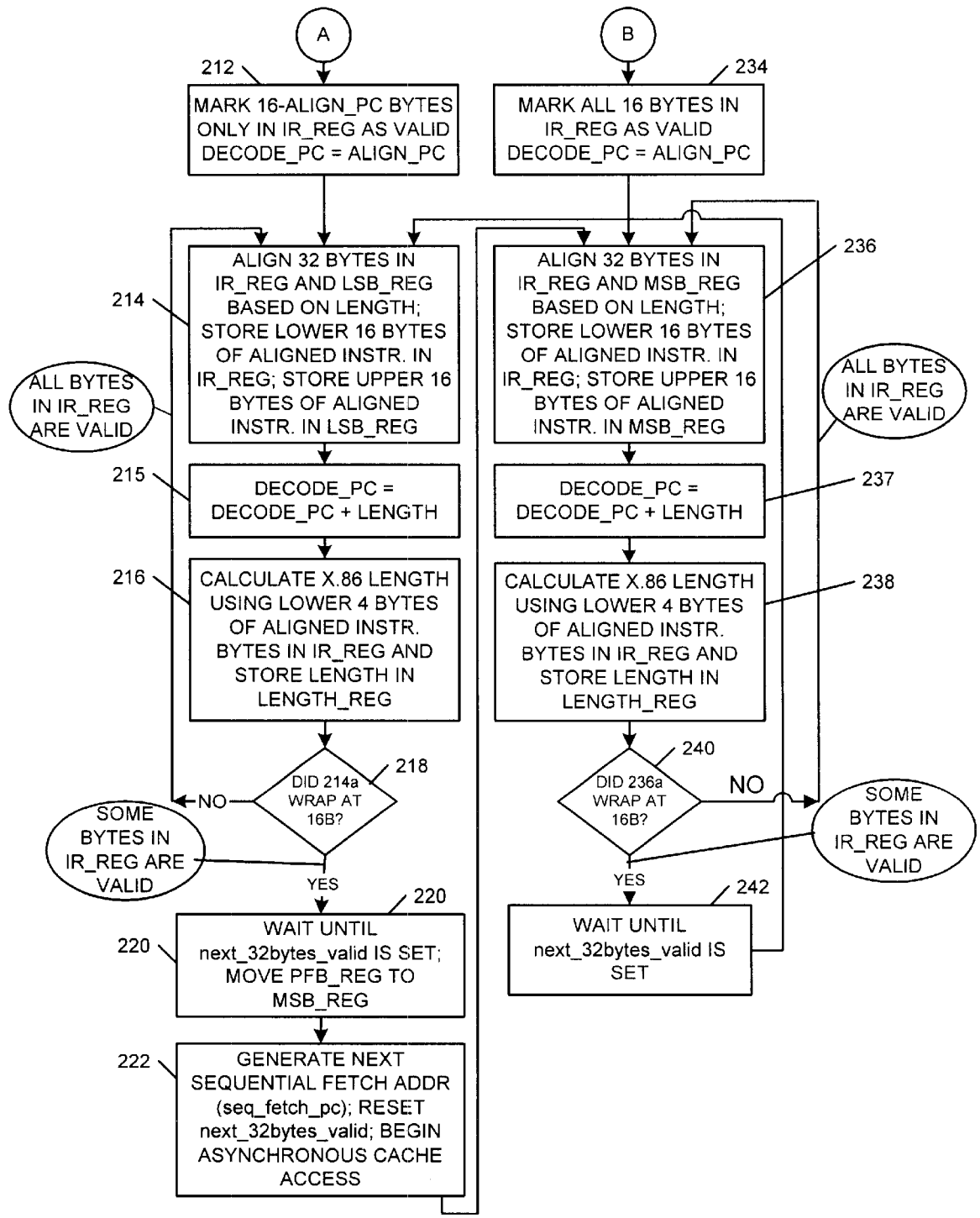
Figure 2C:
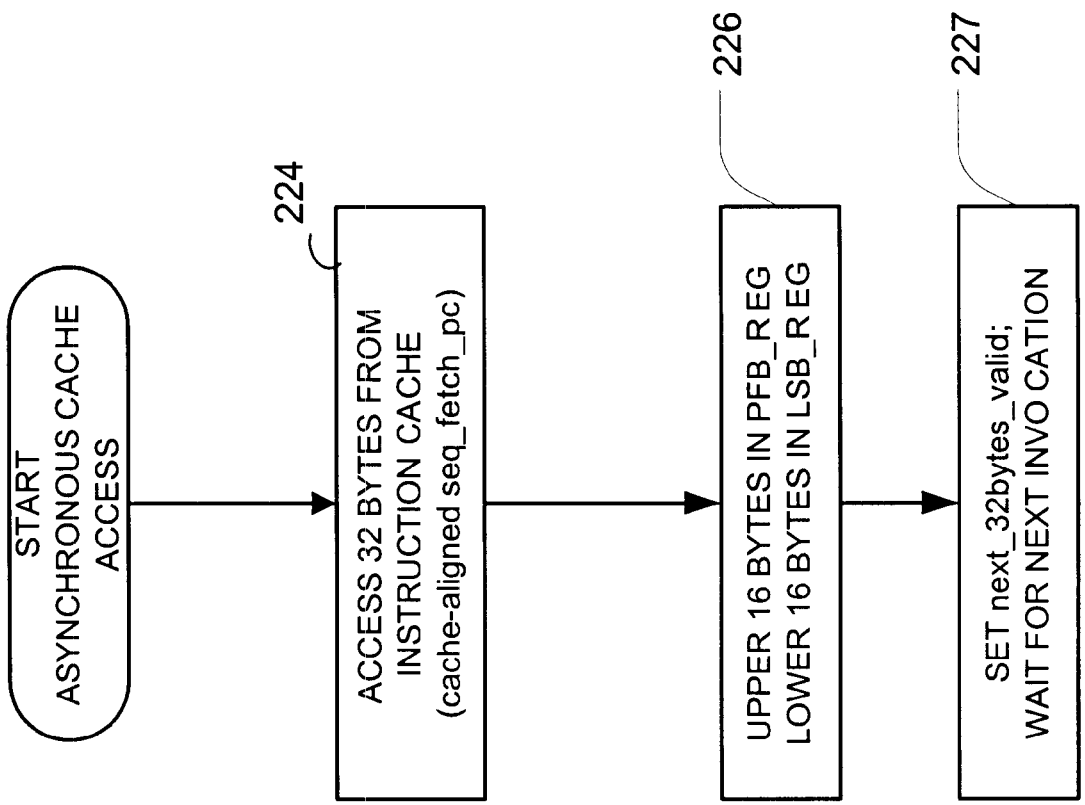

Referring to FIGS. 2a–2c, a method for aligning instructions in a variable length instruction set includes generating a target fetch address (tgt_fetch_PC) as shown in block 200. The aligner control logic 32 accesses thirty-two bytes from the instruction cache 16 using a cache aligned target fetch PC value 14. The cache line contains the instruction bytes corresponding to the target fetch PC address, which is shown in block 202. The process continues to block 204 where the MSB register 20 is controlled to store the upper sixteen bytes and the LSB register 22 is controlled to store the other sixteen bytes of the cache line associated with the cache aligned target fetch PC. The target fetch PC is the target address of the branch instruction. As such, the instruction cache data moves to the MSB_REG and the LSB_REG on the zeroth cycle following a transfer control target. There are two possibilities on the next cycle: the target is in the low part of the cache line or the target is in the high part of the cache line. As shown in block 206 the aligner control logic 32 determines if the align_PC is in the upper half of the cache line. If so, the aligner control logic 32 controls the byte right rotator 24 to align the sixteen bytes in the MSB register based on the align PC (since the target is in the upper half of the cache line the bytes in the LSB register may be discarded). For example, for tgt_fetch_pc=0x800d, cache_aligned_fetch_pc=0x8000, and align_pc=0x800d. As also shown in block 208, the aligner control logic stores the sixteen bytes of the aligned instruction bytes in the instruction (IR) register 36, using the merge multiplexer 28. Accordingly, the merge multiplexer outputs the sixteen bytes from the byte right rotator 24.

As shown in block 209, the process includes generating the next sequential fetch address (seq_fetch_pc), resetting the valid instruction flag next_32 bytes_valid, and beginning an asynchronous cache access. As shown in block 210, the process includes the instruction length calculator 34 calculating the X.86 instruction length using the lower four bytes of the aligned instructions at the output of the merge multiplexer. The length calculator 34 then stores the length of the instruction in length register 38. As shown in block 212, the aligner control logic then marks the sixteen minus align_PC bytes in the instruction register 36 as being valid, indicating that the lower sixteen bytes of the instruction bytes are suitably aligned.

As shown in block 214, the process includes aligning thirty-two bytes in the instruction register and the LSB register 22, based on the length of the instruction. The multiplexers 30e & 30f are controlled by the aligner control logic 32 to select the instruction length. In addition, the process includes storing a lower sixteen bytes of the aligned instruction bytes in the instruction register 36 and storing the upper sixteen bytes of the aligned instruction bytes in the LSB register 22. This is because the aligner is always working with 32 bytes—either {LSB,IR_REG} or {MSB, IR_REG}. As shown in block 215, the method includes setting decode_PC equal to decode_PC+length.

As shown in block 216, the process includes calculating the instruction length using the lower four bytes of the aligned instruction and storing the length in the instruction length register 38. As shown in block 218, the process includes determining whether the process just completed using the LSB as the upper sixteen bytes now needs the MSB as the upper sixteen bytes and vice versa. If the decode_PC+length wrapped at sixteen bytes some bytes in the instruction register are valid. However, if the bytes did not wrap, all bytes in the instruction register are determined to be valid. As shown in block 220, the process includes moving the contents of the PFB register 18 to the MSB register 20. For example, when the aligner switches from processing {LSB_REG, IR_REG} and is ready to process {MSB_REG,IR_REG}, PFB_REG bytes are moved to MSB_REG.

The fetch address generator 12 then generates the next sequential fetch address as shown in block 222. The process continues performing an asynchronous cache access. Referring to FIG. 2c and as shown in block 224, the next cache line associated with the next sequential fetch PC is accessed. The upper sixteen bytes of the next cache line are stored in the PFB register 18 and the lower sixteen bytes are stored in the LSB register 22, as shown in block 226. As shown in block 227, a flag is set (next_32_bytes_valid) indicating an additional fetch group is available for alignment.

Referring back to block 206, if the align_PC is not in the upper half of the cache line, the process includes aligning the thirty-two bytes present in the MSB register 20 and the LSB register 22 based on the align_PC. This is shown in block 230. In addition, the process includes storing the lower sixteen bytes of the aligned instruction bytes in the IR register 36. In addition, the process includes storing the upper sixteen bytes of the aligned instruction bytes in the MSB register 20. As shown in block 231, the process includes generating the next sequential fetch address (seq_fetch_pc), resetting the valid instruction flag next_32_bytes_valid_and beginning an asynchronous cache access. As shown in block 232, the length of the instruction is determined using the lower four bytes of the aligned instruction and the length is stored in length register 38. As shown in block 234, the process includes marking all sixteen bytes in the instruction register as being valid. The process continues as shown in block 236 by aligning thirty-two bytes in the instruction register 36 and the MSB register based on the instruction length. Once aligned, the process includes storing the lower sixteen bytes of the aligned instruction bytes in the IR register and storing the upper sixteen bytes of the aligned instruction bytes in the MSB register. As shown in block 237, the method includes setting decode_PC equal to decode_PC+length. As shown in block 238, the process includes calculating the instruction length of the instruction in the IR register 36 using the lower four bytes of the aligned instruction and storing the instruction length in the length register 38.

As shown in block 240, the process includes determining whether the process just completed used the LSB as the upper sixteen bytes and now needs the MSB as the upper sixteen bytes or vice versa. If the decode_PC+length wrapped at sixteen bytes then some bytes in the instruction register are valid. However, if the bytes did not wrap, all bytes in the instruction register are determined to be valid.

As shown in block 242, if the switch LSB=1 is true, the process waits until the next_thirty-two_bytes valid flag is set. The process then continues to block 226.

Figure 3:
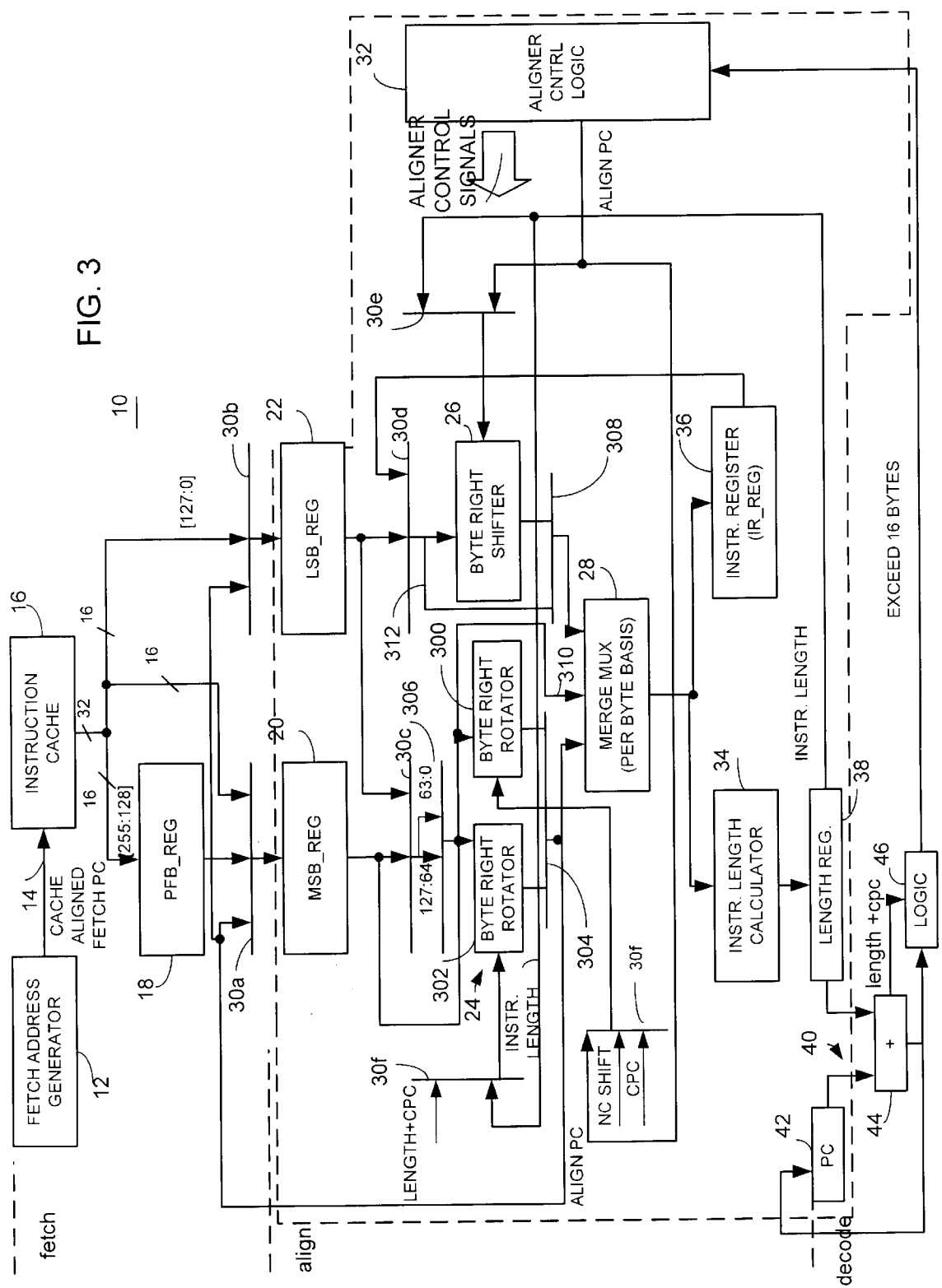
FIG. 3 is a block diagram illustrating an example of an instruction aligner having a plurality of byte right rotators in accordance with another embodiment of the invention.

FIG. 3 shows an alternative embodiment of the variable length instruction aligner which includes a plurality of byte right rotators 300 and 302 along with additional multiplexers 304, 306 and 308. The plurality of byte right rotators 300 and 302 are used to provide suitable timing when used in conjunction with a plurality of multiplexers 30f. In addition, bypass paths 310 and 312 are used to allow bypassing of the byte right rotators and byte right shifter to facilitate timing requirements. The bypass paths provide additional instruction bytes for decoding of a variable length instruction by allowing additional instruction bytes to be placed in the instruction register without undergoing shifting and/or rotating. Multiplexer 308 is used to address timing required to determine that there are no valid instructions. A shift amount is set to zero and normally the byte right shifter propagation will be in series. Additional multiplexer 308 avoids this situation.

The valid register indicates the number of valid bytes in the instruction register for a given cycle. When it is determined that the instruction register does not include sufficient valid instruction bytes to decode a valid instruction length, the byte right shifter shift amount is kept at zero keeping the bytes in the same place (e.g., disabling the shifting operation). When a shift amount is equal to zero, a multiplexer 28 or 308 uses the bypass path 310 or 312 to pass the bytes to the instruction register unchanged if desired. The byte right rotators 302 and 300 use a summation of lengths downstream (the current length plus the current program count). For a valid instruction length decode, the byte right shifter shifts the amount with current length whereas the byte right rotators' shift amount is equal to the summation length. It will be recognized by one of ordinary skill in the art that the aligner controls logic controls, for example, the multiplexers, and suitably controls clock enable signals to the PFB register, MSB register, LSB register and an instruction register. Any instruction valid generation logic that determines whether an instruction is valid generates a valid instruction flag as known in the art.

When non-cacheable instructions are fetched, the aligner is controlled to accommodate fetches of eight bytes at a time. Compatibility requires complete decoding and execution of all instructions within the eight-byte fetch quanta before fetching the next eight bytes. The interface from the instruction memory system to the pre-fetch buffers MSB, LSB, and PFB is timing critical, and the eight bytes of non-cacheable fetch data are stored in the buffers without additional alignment. More specifically, the eight bytes fetched from addresses 0, 32, and so forth are stored in the least significant eight bytes of LSB. The eight bytes from addresses ending in 8, 40, and so forth are stored in the most significant eight bytes of LSB. Similarly data from addresses 16, 48, and so on are stored in the least significant eight bytes of MSB or PFB, while data from addresses 24, 56, and so on are stored in the most significant eight bytes of MSB or PFB.

As a consequence of storing sequentially fetched non-cacheable data as described above, the byte rotators and the byte shifter must be controlled slightly differently than the situation where all 32 bytes of the cache line are obtained at once. There may be unused instruction bytes in IR which must be contiguously aligned with more significant bytes in any of four register locations: the upper or lower halves of MSB or LSB. The lower half of MSB or LSB must be aligned to be adjacent to the most significant unused byte in IR, conceptually skipping over zero (eight bytes remaining in IR) to 16 bytes (no bytes remaining in IR) locations.

The byte right shifter BRS is controlled by instruction length, shifting aligned bytes out of IR, replacing them with unused more significant bytes just as in the cacheable case. The byte right rotator A BRR_A 24 is controlled by last instruction length plus PC to move the lower half of MSB or LSB to be contiguous with zero or more remaining bytes in IR. The byte right rotator B BRR_B 28 is controlled by eight length PC to move the upper half of MSB or LSB to be contiguous with zero or more remaining bytes in IR. These control values also allow bytes to remain in MSB or LSB when IR is completely full (16 bytes). For example: there may be nine bytes in IR, but more needed before a complete instruction is obtained. This leaves a total of 17 bytes. Sixteen are stored in IR and one remains in LSB or MSB, rotated appropriately.

It will be recognized that the operations of the disclosed registers, buffers, rotators, shifters and multiplexers, as well as aligner control logic, may be implemented using any suitable hardware, software, firmware or any suitable combination thereof. In addition, it will be recognized that functionality of the various blocks may be incorporated or shared among different blocks, if desired. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An instruction aligner for a variable length instruction set comprising:
    a byte rotator that rotates a portion of cache aligned fetched bytes from a fetch group;
    a byte shifter that shifts a portion of the cache aligned fetched bytes from the same fetch group; and
    a byte merger operatively coupled to the byte rotator and byte shifter, that selectively outputs aligned variable length instructions for decoding.

2. The instruction aligner of claim 1 wherein the fetch group is a fixed length fetch group of a multiple of eight bytes and wherein the portions of cache aligned fetched bytes are also multiples of eight bytes.

3. The instruction aligner of claim 1 wherein the byte rotator and byte shifter are operatively responsive to fetch instruction length data and to an align program counter value corresponding to a program counter value of a fetched instruction.

4. The instruction aligner of claim 1 including:
    an aligner control logic operative to provide an align program count value corresponding to a program counter value of a fetched instruction;
    a more significant byte (MSB) register operatively controlled by the aligner control logic to store an upper number of bytes of a current fetch group;
    a less significant byte (LSB) register operatively controlled by the aligner control logic to store a lower number of bytes of the current fetch group until a first instruction byte has been aligned, and to store a lower number of bytes of a next fetch group; and
    an instruction length calculator operatively coupled to provide an instruction length of the fetched instruction for the byte rotator and byte shifter.

5. The instruction aligner of claim 4 including an MSB prefetch buffer operatively coupled to an instruction cache and to the MSB register, to store most significant bytes of the next fetch group.

6. The instruction aligner of claim 4 wherein the upper number of bytes include an upper half of bytes from a fetched cache line and the lower number of bytes include a lower half of bytes from the fetched cache line.

7. The instruction aligner of claim 3 including aligner control logic that determines whether the align program counter value is in an upper half or lower half of a fetched cache line.

8. The instruction aligner of claim 1 including a bypass path operative to bypass shifting of register contents to provide at least one additional instruction byte to facilitate decoding of a variable length instruction.

9. A method for aligning instructions in a variable length instruction set comprising:
    rotating a portion of cache aligned fetched bytes from a same or next fetch group;
    shifting a portion of the cache aligned fetched bytes from the same fetch group; and
    merging, on a byte by byte basis, rotated and shifted bytes to selectively output aligned variable length instructions for decoding.

10. The method of claim 9 wherein the fetch group is a fixed length fetch group of a multiple of eight bytes and wherein the portions of cache aligned fetched bytes are also multiples of eight bytes.

11. The method of claim 9 including the steps of determining an amount of cache line byte rotating and determining an amount of cache line byte shifting in response to instruction length data and to an align program counter value corresponding to a program counter value of a fetched instruction.

12. The method of claim 9 including the steps of:
    providing an align program count value corresponding to a program counter value of a fetched instruction;
    storing an upper number of bytes of a current fetch group in a more significant byte (MSB) register;
    storing a lower number of bytes of the current fetch group until a first instruction byte has been aligned, and storing a lower number of bytes of a next fetch group in a less significant byte (LSB) register; and
    providing an instruction length of the fetched instruction for rotating the portion of the cache aligned fetched bytes and shifting the portion of the cache aligned fetched bytes.

13. The method of claim 12 including the step of storing most significant bytes of a next fetch group in an MSB prefetch buffer.

* * * * *